C. W. HERMANCE.
Culinary Vessel.
No. 103,180.
Patented May 17, 1870.
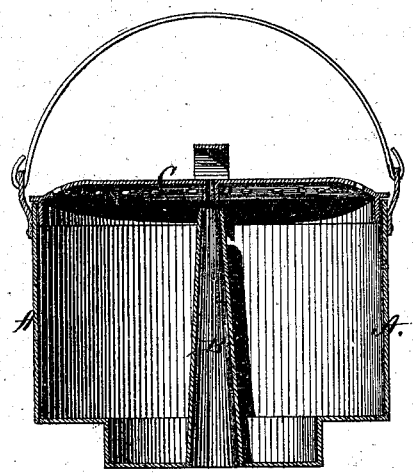

United States Patent Office.

CHARLES W. HERMANCE, OF SCHUYLERSVILLE, NEW YORK.

Letters Patent No. 103,180, dated May 17, 1870.

CULINARY VESSEL.

The Schedule referred to in these Letters Patent and making part of the same

*To all whom it may concern:*

Be it known that I, CHARLES W. HERMANCE, of Schuylersville, in the county of Saratoga and in the State of New York, have invented certain new and useful Improvements in Meat and Vegetable-Boilers; and do hereby declare that the following a full, clear, and exact description thereof, reference being had to the accompanying drawings and to the letters of reference marked thereon making a part of this specification.

The nature of my invention consists in the construction and arrangement of a vessel for boiling meat and vegetables, as will be more fully hereinafter set forth.

In order to enable others skilled in the art to which my invention appertains to make and use the same, I will now proceed to describe its construction and operation, referring to the annexed drawings which represent a longitudinal vertical section of my improved boiler.

A represents a vessel, of any suitable material, shape, and dimensions, having an aperture in the center of its bottom, from which rises a tapering-tube, B, said tube extending upward to the top of the vessel.

C represents the cover, which is, near its edges, perforated with a series of small holes, and, in its center, provided with an aperture which is smaller than the upper end of the tube B. From this aperture in the cover C descends a small tube to within about an inch from the upper end of the tube B.

The object and result of my invention is to produce a vessel for boiling meats and vegetables that will entirely prevent the escape of steam or the smell of cooking-vegetables from entering the room. The tube B, attached to the bottom, furnishes a means of escape for the steam as fast as generated, and the tube D and apertures in the cover provides a draught, which greatly facilitates the expulsion of steam into the stove, instead of escaping into the room.

Having thus fully described my invention,

What I claim as new, and desire to secure by Letters Patent, is—

In combination with a vessel, A, the tapering-tube B and perforated lid C, with downward-projecting tube D, all substantially as set forth.

In testimony that I claim the foregoing, I have hereunto set my hand and seal this 19th day of March, 1870.

CHARLES W. HERMANCE. [L. S.]

Witnesses:
 G. F. WATSON,
 J. H. D. KIDDER.